THIRD WIRE FEEDER APPARATUS EMPLOYING VACUUM CAPTURE

Filed Jan. 14, 1969 3 Sheets-Sheet 1

INVENTORS
JOSEPH H. LIMA
DONALD A. MARQUIS
HERWIG STERNBERG

BY Maurice H. Klitzman
ATTORNEY

Jan. 5, 1971 J. H. LIMA ET AL 3,551,986

THIRD WIRE FEEDER APPARATUS EMPLOYING VACUUM CAPTURE

Filed Jan. 14, 1969 3 Sheets-Sheet 2

United States Patent Office 3,551,986

Patented Jan. 5, 1971

3,551,986

THIRD WIRE FEEDER APPARATUS EMPLOYING VACUUM CAPTURE

Joseph H. Lima, San Jose, Calif., and Donald A. Marquis, West Hurley, and Herwig Sternberg, Woodstock, N.Y., assignors to International Business Machines Corporation, Armonk, N.Y., a corporation of New York Filed Jan. 14, 1969, Ser. No. 790,957
Int. Cl. H05k *13/04;* B23p *19/04*
U.S. Cl. 29—203 8 Claims

ABSTRACT OF THE DISCLOSURE

An apparatus is disclosed which is designed to capture cores already threaded upon pairs of column wires and position the captured cores to allow a third wire to be threaded through the captured cores, thus forming a row. The apparatus employs specially shaped fixtures as well as air jets and vacuum means to capture and position the cores at the desired locations.

This invention relates generally to the threading of magnetic cores and more particularly to the threading of a third wire through each core in a memory plane when two wires in the same column direction have already been threaded through each core in each column.

Magnetic cores have been widely used in modern high-speed electronic computers as storage elements. As the limits of technology have progressed to higher and higher speed circuitry, the associated speed of the magnetic core storage elements has not been able to progress at the same rate. As a consequence, core storage devices have become relatively slow speed devices in comparison to the circuit speeds now attainable in electronic computers.

Because of the speed of the storage unit is an important factor in the overall processing speed of a computer system, efforts have been made to improve the operational speed of storage elements. The speed of storage elements is a function of the switching speed of the magnetic cores used. It has been found that through using very small magnetic cores the switching speed of the storage unit can be vastly improved.

One method of threading cores already pre-threaded upon two column wires has been shown in the copending application of Hazel and Mueller entitled "Method and Apparatus for Wiring Magnetic Core Matrices," Ser. No. 452,101 filed on Apr. 30, 1965, now U.S. Pat. No. 3,460,245.

Another method of threading cores already pre-threaded upon column wires has been shown in a copending application of Gerald B. Bardo entitled "Apparatus for Wiring Personalized Core Storage Arrays," Ser. No. 727,481, filed on May 8, 1968.

Various other methods of threading magnetic cores for use in core storage planes have been suggested in the prior art. The methods suggested range all the way from fully automated threading devices to threading techniques involving human intervention. These methods, however, are not especially adapted to the problems associated with threading very small cores. When the core size becomes very small, it becomes impractical to have any human intervention in the manufacturing process as such intervention requires the use of microscopes in order to perform the desired tasks. Additionally, automated devices have proved to be non-adaptive to use with very small cores. When two wires have been threaded through a small core in one direction, it has proved to be a difficult problem to separate and align the cores such that a third wire may be passed through a core on each of the pair of column wires so as to form a row.

OBJECTS

Accordingly, a principal object of this invention is to provide an improved apparatus for positioning cores pre-threaded upon two column wires and threading the positioned cores with a third wire to form a row.

It is another object of this invention to provide a device which can accurately separate one core already threaded by two wires from a plurality of cores pre-threaded on the same two wires and position the so separated core such that a third wire will pass through the center of the core as well as between the two previously threaded wires.

DESCRIPTION

In accordance with the foregoing objects, this invention provides a rear block which is positionable so as to impede the motion of the magnetic cores threaded on each of the pair of column wires. Air jets along each column force the threaded magnetic cores into contact with the rear block. The facing portions of the blocks are formed with cooperating clearances which co-act with a vacuum means to establish an air flow between the facing portions of the blocks which aids in the capture of one core per column. A vibrational force is applied to the system while the front block rises vertically and, with a ramp cam action, the front block displaces the uncaptured cores away from the face of the rear block. As the front block rises, it acts to channel the vacuum air flow so as to hold the separated row of cores while at the same time the vibration of the apparatus acts to aid the separation of the unselected cores. When the front block is in its fully raised position, one core per column is held between the front and rear blocks in such a position that a third wire may be threaded through each of the captured cores. After the third wire has been threaded and tested, the rear block falls and the combination of front and rear blocks are escaped away from the last threaded cores. This escapement also acts to move the remaining cores threaded upon the column wires a sufficient distance so as to be near the position of the next row. The front block subsequently lowers and again the combination of front and rear blocks are escaped away from the last threaded cores to the position where the next row is to be located. The rear block is then raised so as to capture the next core for each column when the air jets are turned on. This cycle is then repeated until all the cores previously threaded upon the column wires have been threaded with a third wire.

The foregoing and other objects, features and advantages of the invention will be apparent from the following more particular description of a preferred embodiment of the invention, as illustrated in the accompanying drawings wherein.

For clarity of illustration the cores and the wires threaded therethrough as well as the co-operating portions of the front and rear block are shown in greatly enlarged scale while the other parts of the apparatus are indicated in a symbolic or diagramatic fashion.

Figure 7:
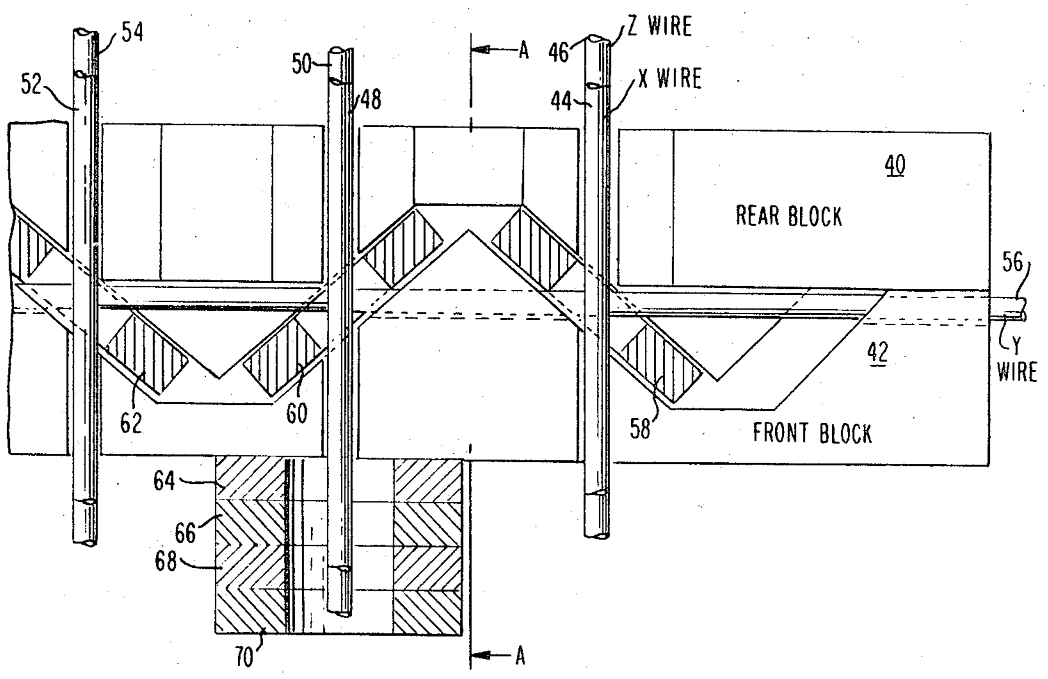
FIG. 7 shows a top view of the assembly apparatus with cores in place.
Figure 7A:
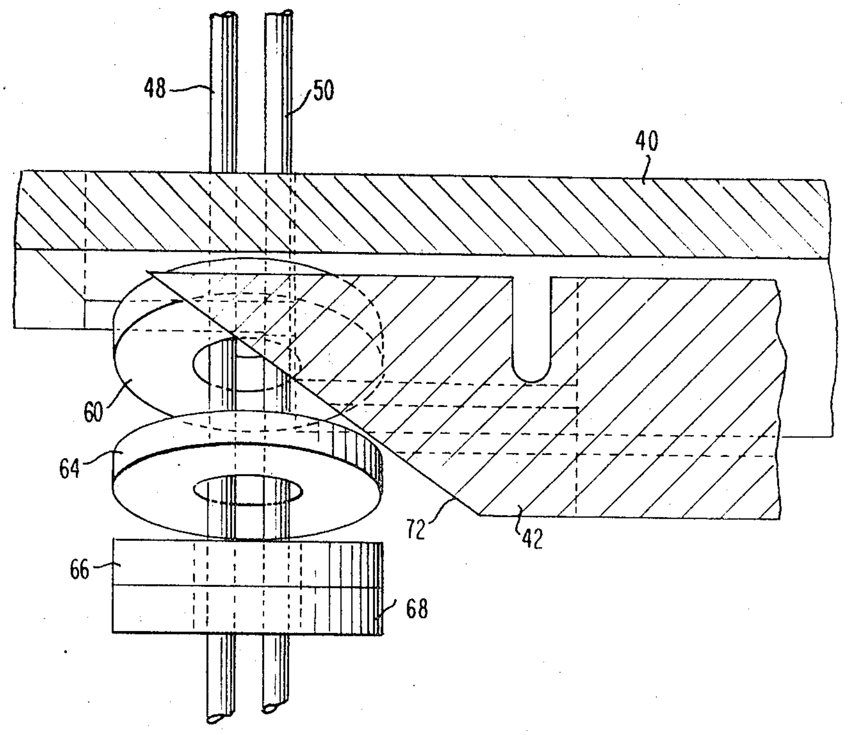

FIG. 7A shows a sectional view with the front block partially raised taken along the line A—A in FIG. 7.

Figure 8:
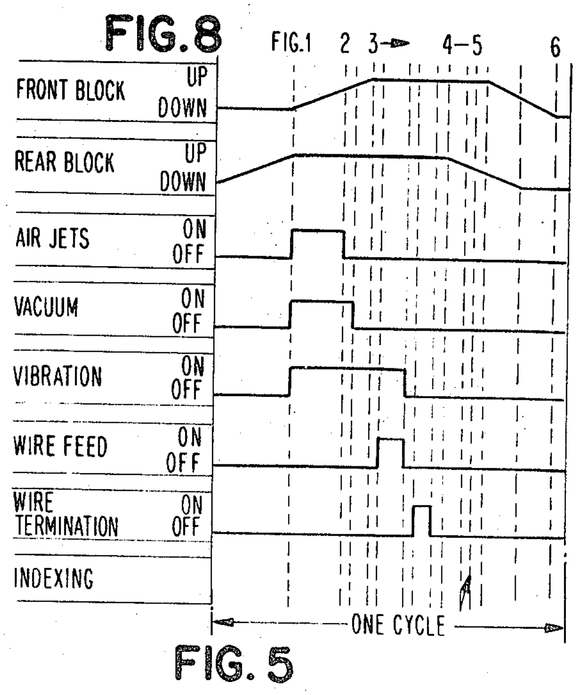

FIG. 8 shows schematically the timing of the various mechanical movements.

Figure 1:
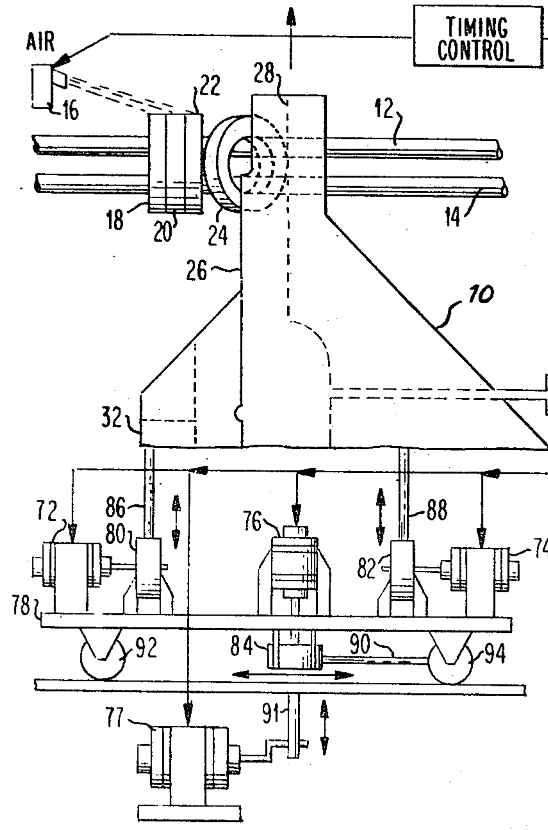
FIGS. 1–6 represent schematically the relative movement of the movable parts in the assembly apparatus.

Referring now to FIG. 1, rear block 10 is shown in its fully raised or core capturing position with column wires 12 and 14 passing through a slot in the top of the rear block 10. Air jet 16 forces the magnetic cores 18, 20, 22, and 24 into contact with rear block 10. The face of the rear block 26 has vertical serrations forming a recess 28 into which magnetic core 24 is forced. The required force comes from air jet 16. Vacuum means 30 is any kind of vacuum pump which will tend to draw air through recess 28 so as to draw magnetic core 24 into recess 28 and hold said core in position when the resulting air flow is confined and directed by the co-operating faces of the front and rear block.

Both front block 32 and rear block 10 are movable in the vertical direction as shown in FIG. 1. The connecting rods 86 and 88 form a solid interconnection between the front and rear blocks (32 and 10) and the gear means 80 and 82. Gear means 80 and 82 are any device which will translate rotary motion of motors 72 and 74 into linear motion, either up or down as shown. Gear means 80 and 82 could be rack and pinions or any other device to produce the desired linear motion.

Motors 72 and 74 are anchored to platform 78. The motor 76, gear means 84, and drive shaft 90 coact so as to cause the platform 78 to move relative to workpiece. Drive shaft 90 is connected to wheel 94 so as to enable the platform to be moved. The movement of the platform 78 on wheels 72 and 74 allows the displacement of front block 32 and rear block 10 along the length of column wires 12 and 14. It will be recognized by those skilled in the art that there are many mechanical means for providing the necessary movements to practice this invention and the mechanism herein described is only representative of one possible implementation.

All the timing controls for the various motors and the vacuum means are provided by the Timing Control shown in FIG. 1. The timing sequences are shown in FIG. 8. The Timing Control precisely operates the movable elements in the manner as herein described.

Figure 2A:
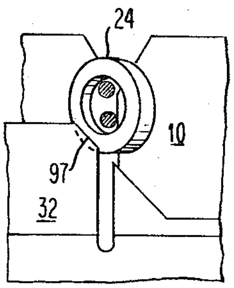
FIG. 2A is a fragmentary sectional view taken along line A—A in FIG. 2.
Figure 2:
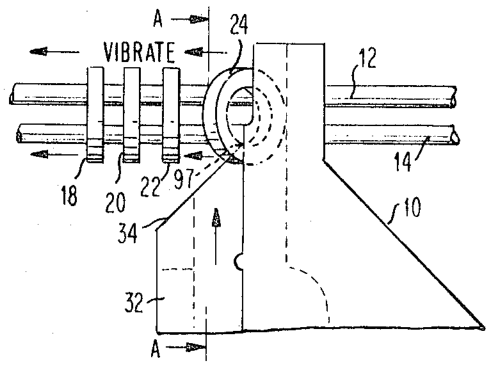

FIGS. 2 and 2A shows schematically the second phase of the threading operation. During the second phase vacuum means 30 is operative and rear block 10 remains stationary. As the front block 32 rises, an edge portion 97 catches the lower side portion of core 24. As seen in FIGS. 1 and 2, the angular formed recess of rear block 10 has canted core 24 on wires 12 and 14 to enable this capture. Air jet 16 is turned off and the whole mechanism is vibrated so as to facilitate the movement of the magnetic cores 18, 20, and 22 along the column wires 12 and 14. The vibration may be generated by many alternate methods. FIG. 1 shows one possible method which uses motor 77 to move tie rod 91 vertically. The tie rod 91 connects to the whole surface upon which the positioning mechanism rests and thus causes everything resting thereon to be vibrated. During phase 2 the front block 32 is raised in the direction as shown. The leading edge 34 of front block 32 forms a ramp-like cam which forces magnetic cores 18, 20, and 22 in the direction as shown as front block 32 rises.

Figure 3:
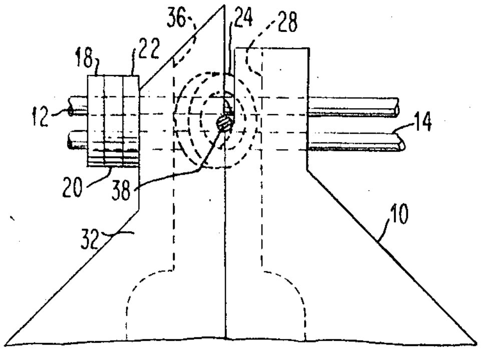

FIG. 3 shows front block 32 in its fully raised position at the end of the second phase. Front recess 36 is a cutout area in the rear face 27 of front block 32 which complements the recess 28 within rear block 10 in the positioning of the captured magnetic core 24. The recesses in combination position magnetic core 24 so that a third wire 38 may pass through magnetic core 24 in a direction which would be vertical to the page of FIG. 3. It should be noted that FIG. 3 is only schematic of one set of column wires and that in the actual apparatus more than one magnetic core is positioned by front block 32 and rear block 10. Thus, when third wire 38 is passed through magnetic core 24 it may also pass through other cores on other pairs of column wires which have been similarly aligned by front block 32 and rear block 10 as shown in FIG. 7. During the threading of the captured magnetic cores, the vacuum means is inoperative so that the captured cores are free to move slightly to compensate for small misalignments. However, during the threading operation the vibration is continued to aid in the movement of the captured cores. After the threading is complete, the vibration means is turned off by the Timing Control and tests are performed to check the threaded wires.

Figure 4:
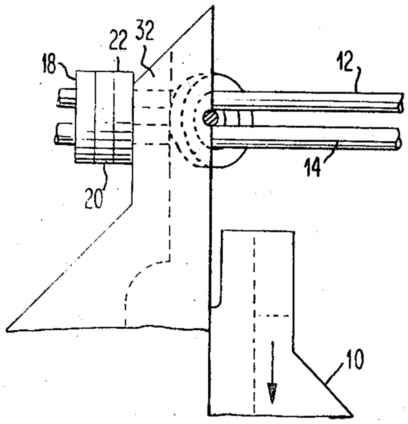

When the threading and testing of the third wire is complete, the rear block 10 is lowered in the direction as shown in FIG. 4. The lowering of rear block 10 is necessary so that the escapement of rear block 10 and front block 32 can be accomplished.

Figure 5:
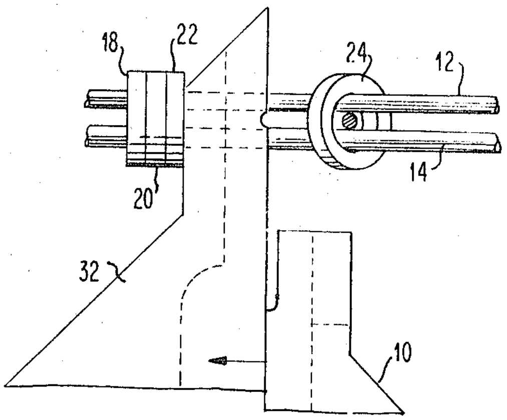
Figure 6:
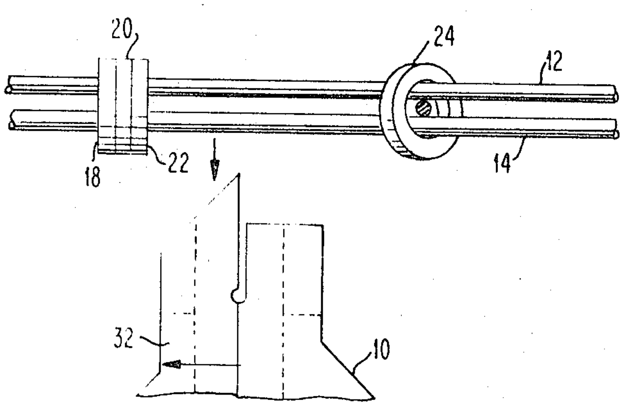

FIG. 5 shows the escapement of the front block 32 and the rear block 10 in such a way as to slide magnetic cores 18, 20 and 22 along column wires 12 and 14 and away from the threaded core 24. The edge of front block 32, which is in contact with core 22, is shown to be vertical. Other shapes could be employed, however, it has been found that the vertical face is advantageous because the prethreaded cores slide more easily along wires 12 and 14. Once the magnetic cores 18, 20, and 22 have been moved a sufficient distance from magnetic core 24, front block 32 is lowered as shown in FIG. 6. The front block 32 and rear block 10 are then escaped in the direction shown to be the final position where the next row of cores will be threaded with a third wire. The raising of rear block 10 into position as shown in FIG. 1 is the last operation in the continuous cycle of manufacture. A subsequent row is threaded by the same sequence of operations as demonstrated in FIGS. 1–6.

It will be recognized by those skilled in the art that the phase of the operation shown in FIG. 6 is optional. The operation depicted in FIG. 5 displaces magnetic cores 18, 20, and 22 as well as front block 32 and rear block 10 a sufficient distance such that the front block 32 need only be lowered and the rear block 10 be raised to place the apparatus in the position as depicted by FIG. 1. The advantage of using the optional motions depicted in FIG. 6 is that the pre-threaded magnetic cores do not have to be moved as often along the column wires and thus are less likely to be damaged. The pattern of cores produced by the operation as described above produces the so-called herringbone pattern. However, for improved operation of magnetic cores, it has been found that the so-called checkerboard pattern is desirable. With the front and rear blocks in the position as shown in FIG. 6, it is possible to move the blocks by a means not shown in a direction perpendicular to the plane of the drawing, thus reversing the cant of the next threaded core on a given pair of wires. This indexing will align a different pair of co-operating recesses so as to create the well-known checkerboard pattern of the threaded magnetic cores.

Referring now to FIG. 7, a top view is shown of the apparatus schematically represented by FIGS. 1–6. The front block 42 and rear block 40 are shown in the position as represented in FIG. 3. Magnetic cores 58, 60, and 62 are shown in their captured position and with row wire 56 passing through each of the cores in a direction perpendicular to the column wires. The pairs of column wires 44 and 46, 48 and 50, and 52 and 54 are shown passing through magnetic cores 58, 60, and 62 as well as through the slots provided in the rear block 40 and front block 42. In addition, column wires 48 and 50 are shown passing through magnetic cores 64, 66, 68, and 70. The magnetic cores 64, 66, 68, and 70 represent the magnetic cores that were separated away from magnetic core 60 by the rising of the front block 42 into the position as shown in FIG. 7. For schematic purposes, magnetic cores were not drawn on the column wire pairs 44 and 46, and 52 and 54, however, in actual operation of the apparatus there would be magnetic cores located on column wire pairs 44 and 46, and 52 and 54 in the same position as shown for the column wire pair 48 and 50.

FIG. 7A shows a sectional view from the right of the section A—A shown in FIG. 7. The front block 42 as shown in FIG. 7A is in its partially raised position so as to show how the ramp cam leading edge 72 separates the extra cores on the column wire pair 48 and 50 from the captured magnetic core 60. As shown in FIG. 7A, magnetic cores 64, 66, and 68 are being displaced along the column wires 48 and 50 by the cam action of the front block 42.

FIG. 8 shows a timing chart of the operation of the Timing Control in the core threading apparatus described. It shows the periods when the front and rear blocks are rising and falling in relation to FIGS. 1–6. The air jets are shown to be on while the front block is rising, thus facilitating the capture of cores between the front and rear blocks. The vibration means is shown active during the rise of the front block and remaining active until the third wire is fed through all the captured cores. After the cores in the row are tested, the third wire is terminated at the frame of the memory plane. This phase occurs at the time shown and labeled Wire Termination. After wire termination is complete, indexing of the cores and front and rear blocks occurs.

While the foregoing described embodiment employs the use of a mechanism wherein one wire is threaded through the magnetic cores held by the front and rear blocks, it will be recognized by those skilled in the art that this technique could be adapted to the threading of more than one wire provided the proper modifications were made to the front and rear block so as to insure precision positioning of the cores being threaded as well as a guideway for the wires that are to be threaded through magnetic cores.

Other modifications or refinements can be made where particular operating conditions require. For example, the invention has been shown as having a stationary workpiece and a movable threading apparatus. Those skilled in the art will readily recognize that the front and rear blocks need only be movable in the vertical direction as shown and that the workpiece could be made movable in the horizontal direction as shown.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An apparatus for positioning magnetic cores in a row to allow threading a single wire through the apertures of said magnetic cores pre-threaded upon column wires perpendicular to said row comprising:

a rear block having recesses for capturing a single pre-threaded magnetic core on each column and positioning said captured magnetic cores at an acute angle to said column wires;

a front block with recesses therein, said front block recesses being complementary to the recesses in said rear block for holding said captured magnetic cores between said front block and said rear block and in a row and in such a position that a third wire can be threaded through each of said captured magnetic cores, said front block being reciprocable in a direction orthogonal to the plane of said column wires and having a cam surface operable to separate said captured cores from a supply of uncaptured cores pre-threaded upon said column wires; and a vacuum means for drawing air through the recesses so as to securely hold said captured magnetic cores between said front block and said rear block.

2. The apparatus in claim 1 employing in addition, a means for escaping said front block and said rear block along said column wires after the operation of said threading means so as to place said front block and said rear block in a position of the next row to be threaded.

3. The apparatus in claim 1 employing, in addition, an air jet means to force said pre-threaded magnetic cores upon each of said column wires into said recesses upon said rear block, thus facilitating the capture of magnetic cores by said rear block.

4. The apparatus in claim 1 further including a vibratory means for aiding in the separation of said supply cores from said captured cores.

5. An apparatus for positioning magnetic cores in a row to allow threading a single wire through the apertures of said magnetic cores pre-threaded upon column wires perpendicular to said row comprising:

a rear block with slots in the top of said rear block to allow said rear block to intersect said column wires, said rear block additionally having recesses for capturing a single pre-threaded magnetic core on each column wire and positioning said captured magnetic core at an acute angle to said column wire;

means for moving said rear block into a position where said column wires pass through the slot in the top of said rear block;

air jet means for forcing said pre-threaded magnetic cores into said recesses in said rear block when said rear block is in its fully moved position and said column wires are passing through the slots in the top of said rear block;

a front block with recesses upon the rear face and slots in the top of said front block, said front block recesses being complementary to the recesses in said rear block for holding said captured magnetic cores in position and said slots in the top of said front block to allow said front block to be moved into the position for holding said captured cores between said front and rear blocks, said front block additionally having a ramp-like cam leading edge for separating the captured magnetic cores from the remaining pre-threaded magnetic cores upon said column wires;

means for moving said front block so as to separate the captured cores from the remaining pre-threaded magnetic cores upon said column wires;

means for moving said rear block away from said column wires after said captured cores have been threaded;

means for escaping both said front block and said rear block from said threaded magnetic cores so as to displace said front block, said rear block, and said pre-threaded magnetic cores along said column wires to the position where the next row is to be threaded; and means for moving said front block away from said column wires to allow the pre-threaded magnetic cores to be freely movable and to be captured by said rear block.

6. The apparatus in claim 5 additionally comprising a vacuum means for drawing air through the recesses in said front block and said rear block to securely hold said captured magnetic cores between said front block and said rear block.

7. An apparatus for positioning magnetic cores in a row to allow threading a single wire through the apertures of said magnetic cores pre-threaded upon column wires perpendicular to said row comprising:

a rear block with slots in the top of said rear block to allow said rear block to intersect said column wires, said rear block additionally having recesses for capturing a single pre-threaded magnetic core on each column wire and positioning said captured magnetic core at an acute angle to said column wire;

means for moving said rear block into a position where said column wires pass through the slot in the top of said rear block;

air jet means for forcing said pre-threaded magnetic cores into said recesses in said rear block when said rear block is in its fully moved position and said column wires are passing through the slots in the top of said rear block;

a front block with recesses upon the rear face and slots in the top of said front block, said front block recesses being complementary to the recesses in said rear block for holding said captured magnetic cores in position and said slots in the top of said front block to allow said front block to be moved into the position for holding said captured cores between said front block and said rear block, said front block additionally having a ramp-like cam leading edge for separating the captured magnetic cores from the remaining pre-threaded magnetic cores upon said column wires;

means for moving said front block so as to separate the captured cores from the remaining pre-threaded magnetic cores upon said column wires;

means for moving said rear block away from said column wires after said captured cores have been threaded;

means for escaping said front block, said rear block, and said pre-threaded magnetic cores along said column wires so as to position said pre-threaded magnetic cores at the location where the next row of wires is to be threaded by the device;

means for moving said front block away from said column wires; and means for moving said front block and said rear block to the position where the next row is to be threaded.

8. The apparatus in claim 7 additionally comprising a vacuum means for drawing air through the recesses in said front block and said rear block to securely hold said captured magnetic cores between said front block and said rear block, said vacuum means being inactive when said rear block is moving.

References Cited

UNITED STATES PATENTS

| | | | |
|---|---|---|---|
| 3,134,163 | 5/1964 | Luhn | 29—241X |
| 3,460,245 | 8/1969 | Hazel et al. | 29—604 |

THOMAS H. EAGER, Primary Examiner

U.S. Cl. X.R.

29—241